Jan. 7, 1958     H. M. POLLEY     2,818,651
CUTTING MACHINE
Filed Jan. 17, 1955
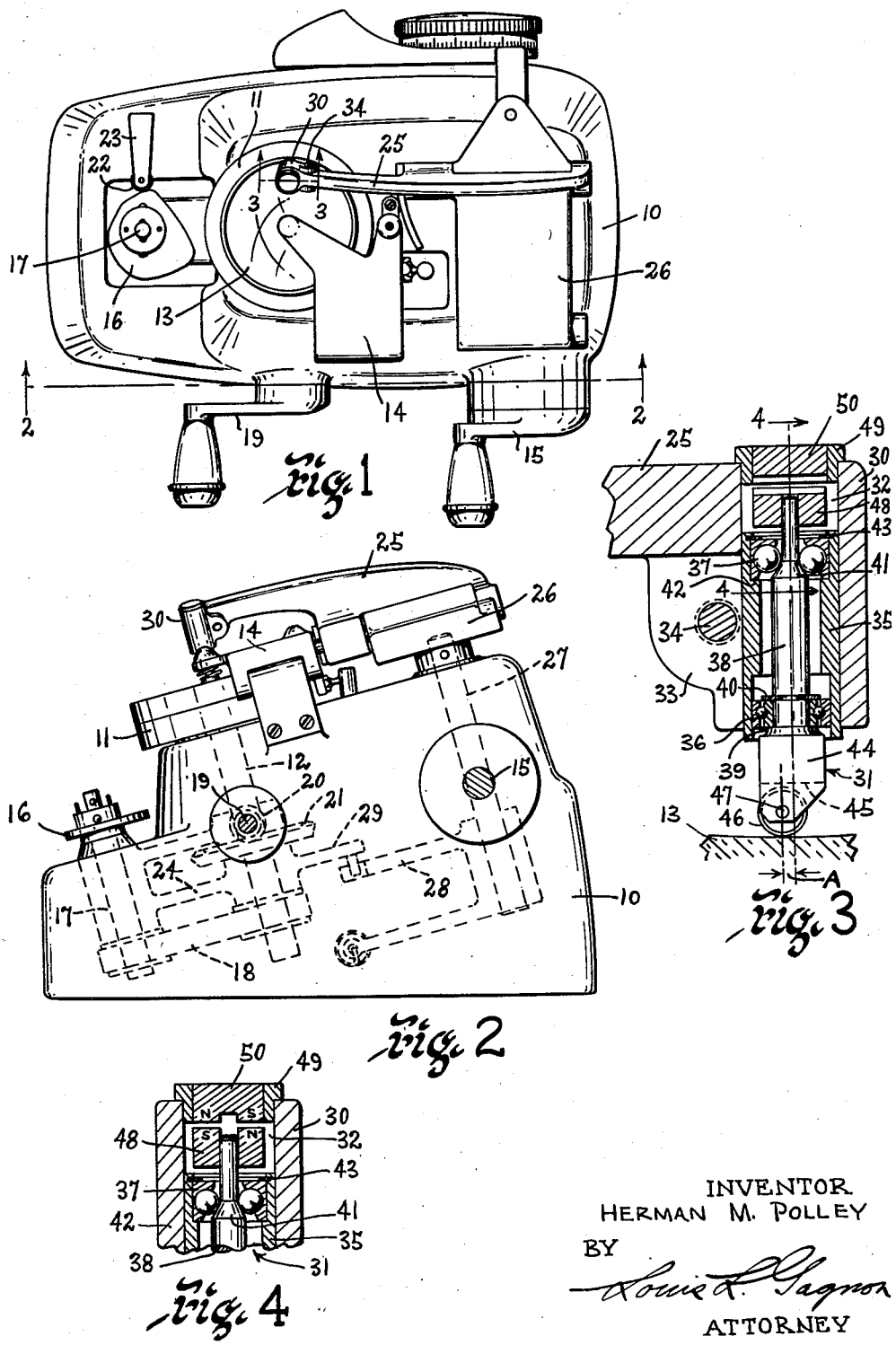
INVENTOR.
HERMAN M. POLLEY
BY
*Louis L. Gagnon*
ATTORNEY United States Patent Office 2,818,651
Patented Jan. 7, 1958

2,818,651

CUTTING MACHINE

Herman M. Polley, Southbridge, Mass., assignor to American Optical Company, Southbridge, Mass., a voluntary association of Massachusetts Application January 17, 1955, Serial No. 482,075

6 Claims. (Cl. 33—28)

This invention relates to improvements in optical machinery of the type used for cutting articles such as lenses to desired perimetral contour shapes, and relates particularly to a novel cutting device for such machines.

In the manufacture of lens cutting machines for use in cutting articles such as lenses to predetermined perimetral contour shapes, either irregular or circular, the industry has constantly encountered the problem of supporting a cutting wheel or the like so that the wheel will normally be located in a predetermined plane with its cutting edge facing in the direction of cut and will tend to return to that plane when altered therefrom. To prevent the cutting wheel from dragging on the lens and scratching or otherwise impairing the lens surface, it is desirable that the cutting wheel be positioned substantially in the plane of the tangent of the cutting path at the point of engagement of the cutting wheel with the lens surface. This is particularly desirable at the start of a cutting operation just prior to castering of the cutting wheel when the lens is rotated. Therefore, it is desirable that the cutting wheel be normally so positioned in the rocker arm that when the rocker arm is moved toward the lens the cutting wheel will engage the lens surface while held substantially in the plane of the tangent of the path to be cut at the point of engagement of the cutting wheel with the lens.

Accordingly, it is a principal object of this invention to provide a lens cutting machine embodying improved means for supporting a cutting wheel whereby the cutting wheel will be free to respond to desired angular movements with respect to a predetermined plane but will be constantly urged to assume a position in said predetermined plane.

Another object is to provide novel means for supporting a cutting wheel in a lens cutting machine of the above character and embodying magnet means so arranged that when performing their natural inherent magnetic function they will tend to urge the cutting wheel to assume a position in a predetermined plane.

Another object is to provide novel means of the above character for supporting a cutting wheel in a lens cutting machine whereby the cutting wheel may upon application of slight force be rotated to any desired extent from a normal predetermined plane without breakage of parts or impairment of the natural function thereof and whereby upon release of such force will assume a position in the predetermined plane.

A still further object is to provide a lens cutting machine embodying a rotatable work table for supporting a lens for rotation therewith and a rocker arm having a portion overlying the work table and supporting a cutting wheel for engagement with the lens, the rocker arm being movable transversely of the lens to cause the cutting wheel to engage the lens, as the lens rotates, throughout a path conforming to the perimetral contour shape of a pattern operatively associated with the rocker arm, and means for supporting the cutting wheel in the rocker arm whereby the cutting wheel will automatically assume a position, when initially placed upon the lens surface, substantially in the plane of the tangent to the path of cut to be made at the point at which the effective cutting portion of the cutting wheel engages the lens surface.

Other objects and advantages of the invention will become apparent from the following description taken in connection with the accompanying drawings, in which:

Fig. 1 is a plan view of a lens cutting machine embodying the present invention;

Fig. 2 is a side elevational view of the machine shown in Fig. 1;

Fig. 3 is an enlarged fragmentary vertical sectional view taken substantially on line 3—3 of Fig. 1; and Fig. 4 is an enlarged fragmentary vertical sectional view of a portion of the cutting device taken substantially on line 4—4 of Fig. 3.

Referring more particularly to the drawings wherein like characters of reference designate like parts throughout the several views, the cutting device embodying the present invention is shown in Figs. 1 and 2 as being applied to a lens cutting machine of the type shown and described in pending U. S. patent application Serial Number 474,183, filed December 9, 1954 in the name of Oscar W. Dillon, now Patent No. 2,778,115, issued January 22, 1957. However, it is to be understood that the presently described cutting device may be applied without more than slight modification to many conventional lens cutting machines.

For details of the construction and use of the cutting machine shown in Figs. 1 and 2 reference is made to the pending Dillon patent application. However, briefly the machine comprises a base 10 having a work table 11 rotatably supported thereon by a rotatable spindle 12. A lens 13 to be cut is positioned on the work table 11 and clamped thereon by a clamping device 14 which is adapted to be operated through suitable mechanism upon operation of a handle 15. A pattern 16 is mounted on a shaft 17 in the base 10 and is adapted to rotate in synchronism with the work table 11 and spindle 12 by means of a belt 18. Actual rotary motion is imparted manually to the spindle 12 by means of a handle 19 and gears 20 and 21. The pattern 16 is held in engagement with a follower or roller 22 secured by a bracket 23 to the base 10, and the shaft 17 is supported by a lever 24 which is mounted on and pivots about the axis of the spindle 12. Thus, since the pattern 16 is held in constant engagement with the roller 22, rotation thereof will cause the shaft 17 and consequently the lever 24 to swing about the spindle 12 in accordance with irregularities in the perimetral contour shape of the pattern 16.

A rocker arm 25 is mounted by means of a special linkage 26 on the upper end of a shaft 27 which is journaled in the base 10. On the shaft 27 is a lever or arm 28 which is operatively connected with an arm 29 which extends diametrically from the lever 24. Thus, swinging movement of the lever 24 will, through arms 29 and 28, cause rotary movement of the shaft 27 and consequent swinging of the rocker arm 25 in response to the rotation of the pattern 16 and table 11.

The rocker arm 25 is adapted to overlie the work table 11 and is provided with an end portion 30 which carries the cutting device 31. The end portion 30 is provided with a vertical bore 32 in which the cutting device 31 is positioned, the end portion 30 also being provided with a side wall having a slot 33 therein and which extends into the bore 32. Thus, a screw 34 or similar member connecting the portions on each side of the slot 33 can be tightened to urge the walls of the bore 32 into close confining relation with the cutting device 31 to securely prevent displacement thereof.

The cutting device 31 (Figs. 3 and 4) comprises a tubular member 35 which carries adjacent each end respective ball bearing units 36 and 37. The outer race portion of the lower ball bearing unit 36 is tightly fitted into the lower end of the tubular member 35 and the inner race portion is fitted upon a cutter-supporting shaft 38 and held against a ledge 39 formed thereon by a groove and lock washer arrangement 40 or the like. The balls of the upper unit 37 engage directly a tapered portion 41 adjacent the upper end of the shaft 38. The upper outer portion of the bearing unit 37 is held in place against a ledge 42 formed on the inner wall of the tubular member 35 by a lock washer 43 which is positioned in an internal groove provided therefor adjacent the end of the tubular member 35. Thus, the shaft 38 is prevented from displacement within the tubular member 35 and is also permitted free relatively frictionless rotation therein about its own longitudinal axis.

The lower end of the shaft 38 is provided with an enlarged portion 44 having a slot 45 in the end thereof. A cutting wheel or disk 46 is positioned in the slot 45 and is rotatably held therein by an axle 47.

It is desirable, in accordance with the objects of this invention, that the cutting device move in the manner of a caster during a cutting operation; that is, the cutting edge of the wheel should always face in the direction of cut and the wheel should be located in a plane tangent to the path of travel at the point of engagement of the cutting edge with the lens 13. Such action is quite inherent during a cutting cycle and results partially from positioning the longitudinal axis of the axle 47 in slightly offset relation with the longitudinal axis of the shaft 38 as shown at A in Fig. 3. However, the present invention embodies means whereby the cutting wheel 46 may be rotated freely when the device is not in engagement with the lens 13 but will return to a position in a predetermined plane whereby it will, when placed upon the lens 13, be substantially in the desired plane tangential to the path of cut, thus, preventing undesired dragging on the lens surface and possible chipping or scratching of the lens surface.

To provide this feature the upper end of the shaft 38 has a magnet 48 fixedly mounted thereon. In the upper end of the bore 32 is a retainer 49 which carries a second magnet 50 in slightly spaced relation with magnet 48 and with its poles being reversed therefrom when normally positioned. It is apparent that with such a device the shaft 38 and cutting device 31 can be easily rotated in the tubular member 35 against the inherent magnetism of the magnets 48 and 50. However, when the force causing such rotation is removed the magnets 48 and 50 will cause the shaft 38 and cutting device 31 to automatically return to normal position wherein the cutting wheel 46 will be located in the desired predetermined plane. In this instance the predetermined plane is such as to cause the cutting edge of the cutting wheel 46 to face in the direction of the cut and is brought about by reversing the poles of the magnets with a small air gap between them whereby the natural action of the magnet 48 to align itself with the magnet 50 will position the cutting wheel in the desired predetermined plane with its cutting edge in the proper direction as set forth above. It is to be understood, of course, that the poles of the magnet 50 are so oriented with respect to bore 32 as to bring about this result.

From the foregoing description, it will be apparent that all of the objects and advantages of the invention have been accomplished to provide a lens cutting machine having novel means for supporting a cutting element therein.

It will also be apparent that many changes may be made in the details of construction and arrangement of parts shown and described without departing from the spirit of the invention as expressed in the accompanying claims. Therefore, it is to be understood that all material set forth or shown in the accompanying drawings is to be interpreted as illustrative and not in a limiting sense.

I claim:

1. A cutting machine of the character described comprising a table for supporting work to be cut, a rocker arm having a portion overlying the table, a cutter support mounted for free rotary movement in said rocker arm and having a cutter adapted to engage work on the table, magnetic means carried by said rocker arm and magnetic means carried by said cutter support, said magnetic means having their respective poles positioned in adjacent spaced relation with each other and so related as to cause the cutter support, in response to the combined magnetic attractive force of each of said magnetic means, to assume a given position such as to locate the cutter in a predetermined plane.

2. A cutting machine of the character described comprising a table for supporting work to be cut, an arm having a bearing portion therein in overlying relation with the table, a cutter support mounted for free rotary movement in said bearing portion and having a cutter member thereon adapted to engage the work on the table, means for guiding said cutter in a controlled path of cut relative to the work, a first permanent magnetic means fixedly mounted on said arm in alignment with the bearing portion and a second permanent magnetic means mounted on said cutter support to rotate therewith as a unit, said first and second magnetic means being positioned in adjacent spaced relation with each other and having their respective pole portions so related as to cause rotation of said second magnetic means and cutter support as a unit to initially assume and tend to maintain a given position in response to the combined inherent attractive force of each of said magnetic means whereby the cutter will initially be positioned in a predetermined plane.

3. A cutting machine of the character described comprising a table for supporting work to be cut, an arm having spaced ball bearings therein in overlying relation with the table, a cutter supporting spindle mounted for free rotary movement in said spaced bearings and having a cutting wheel pivotally attached adjacent the lower end thereof and adapted to engage the work on the table, a first magnetic means fixedly mounted on said arm in alignment with the bearings and a second magnetic means mounted on the upper end of said cutter supporting spindle to rotate therewith as a unit, said first and second magnetic means being positioned in adjacent spaced aligned relation with each other and having their respective poles so related and oriented as to cause said second magnet means and cutter supporting spindle to rotate as a unit and tend to assume and maintain a given position in response to the combined magnetic attractive forces of the magnetic means whereby the cutting wheel will be initially positioned with its cutting edge disposed in a given direction.

4. In a cutting machine of the type embodying a cutter adapted to be guided in a controlled path relative to the work being cut, the combination of an arm having a bearing therein, a spindle freely rotatable in said bearing, a cutting wheel pivotally attached adjacent the lower end of said spindle about an axis in offset relation with the axis of the spindle and substantially normal to said spindle axis, magnetic means fixedly attached to said arm in alignment with the bearing above the upper end of the spindle and with its poles disposed in a given direction and magnetic means attached to the upper end of said spindle with its poles in adjacent spaced relation with the poles of the first-mentioned magnetic means and further having its poles reversed relative to the poles of said first magnetic means and so oriented with respect to the cutting wheel that when the unlike poles of each of said magnetic means attract and align with each other they will initially position the cutting edge of the wheel in the desired direction of cut.

5. In a lens cutting machine of the character described comprising a work table for supporting a lens and a rocker arm having a portion overlying said work table, a cutting device mounted in said rocker arm and adapted to engage a lens on said work table, said cutting device comprising a unit embodying a tubular member having a shaft rotatable therein, said shaft having one end portion extending outwardly of said tubular member toward the lens and having a cutting wheel thereon, the cutting wheel being mounted in a plane substantially parallel with the axis of said shaft and rotatable therewith about said axis, magnet means secured in one end of said tubular member and arranged with its poles in known relation to a predetermined plane, and a magnet carried by said rotatable shaft with its poles in spaced adjacent relation with the poles of the magnet in the tubular member and further arranged on said shaft with its poles in known relation to the plane of the cutting wheel, said magnets being adapted to function through attraction of unlike poles and repulsion of like poles to rotate said shaft and cutting wheel to tend to cause the cutting wheel to assume a desired position in said predetermined plane.

6. A lens cutting machine comprising the combination of a base, a spindle rotatable in said base and carrying a work table for rotation therewith, a rocker arm mounted on said base and having a portion overlying said work table and carrying cutting means adapted to engage a lens blank on said work table, pattern supporting means operatively connected with said rocker arm for moving said rocker arm and cutting means transversely of said work table, said pattern supporting means embodying a pattern of a selected perimetral contour shape, means for causing synchronous rotation of said pattern means and said work table whereby the cutting device will scribe a path on the lens blank surface corresponding to the perimetral contour shape of said pattern, said cutting device comprising a shaft rotatale in said rocker arm and having a cutting wheel on the end thereof adjacent said lens, a stationary magnet means carried by said rocker arm and arranged with its poles in known relation to a predetermined plane substantially aligned with the tangent of said path scribed by the cutting wheel at the point of engagement thereof with the lens blank surface, and a second magnet carried by and rotatable with said shaft and cutting wheel as a unit and arranged thereon with its poles in adjacent spaced relation with the poles of said stationary magnet and in known relation to the plane of the cutting wheel, said magnets being adapted to function through attraction of unlike poles and repulsion of like poles to rotate said second magnet and consequently said shaft and cutting wheel to tend to cause the cutting wheel to assume a desired position in said predetermined plane.

References Cited in the file of this patent

UNITED STATES PATENTS

| 1,997,561 | Lockhart | Apr. 9, 1935 |
| 2,470,444 | Philippe | May 17, 1949 |

FOREIGN PATENTS

| 63,626 | Austria | Feb. 25, 1914 |